US007738400B2

(12) United States Patent
Galich et al.

(10) Patent No.: US 7,738,400 B2
(45) Date of Patent: Jun. 15, 2010

(54) METHOD OF PROVIDING INTRA-COMPANY TWO WAY VOICE COMMUNICATIONS OVER A DATA NETWORK

(76) Inventors: Michael G. Galich, 5745 N. Newcastle, Chicago, IL (US) 60631; Clifford A. Kohler, 12323 85th Ave., Kenosha, WI (US) 53142; Joseph J. Zvonkovich, 1360 Montezuma Rd., Colorado Springs, CO (US) 80920

( * ) Notice: Subject to any disclaimer, the term of this patent is extended or adjusted under 35 U.S.C. 154(b) by 0 days.

(21) Appl. No.: 11/166,561

(22) Filed: Jun. 24, 2005

(65) Prior Publication Data

US 2005/0249132 A1 Nov. 10, 2005

Related U.S. Application Data

(63) Continuation of application No. 09/356,287, filed on Jul. 16, 1999, now Pat. No. 6,937,575.

(51) Int. Cl.
*H04L 12/28* (2006.01)
(52) U.S. Cl. .......................... 370/254; 370/352; 370/401
(58) Field of Classification Search ....................... None
See application file for complete search history.

(56) References Cited

U.S. PATENT DOCUMENTS 4,191,860 A 3/1980 Weber (Continued)

FOREIGN PATENT DOCUMENTS

WO 01/06754 1/2001

OTHER PUBLICATIONS

Guo, Steven, "Daily Traffic Analysis and Seasonal Adjustment, Abstract", 1996 International Conference for Communications Marketing, Forecasting and Demand Analysis, available on the World Wide Web at: http://www.econ.ilstu.edu/icfc/96progrm.htm; circa Jan. 1996.

(Continued)

*Primary Examiner*—Bob A Phunkulh

(57) ABSTRACT

A method of providing an intra-company voice communication service has the general steps of providing a company with a plurality of remote geographic facilities linked by a data network, determining a call traffic pattern for each of the facilities by analyzing a call detail record for each facility, determining performance specifications for the data network, and providing and implementing a converged digital telephony data network. Through the method of the invention, a service may thereby be provided that allows for a company to eliminate public telephone carrier service charges for intra-company phone calls between remote facilities. A preferred embodiment of the method of the invention utilizes the World Wide Web for carrying out various of the steps of the invention to achieve time and travel savings. Further embodiments of the invention include programming the gateway at one or more of the company facilities to access a PSTN whereby phone calls from the data network may be sent and received over the PSTN. An additional embodiment of the invention interconnects data networks from a plurality of companies which each are individually intra-connected between facilities to carry digital telephony format communications. Digital telephony format calls may thereby be sent between any of the various facilities of the two companies. Additionally, a gateway at one or more of the facilities of the interconnected companies may be programmed to interface with a PSTN to send and receive phone calls over the PSTN.

29 Claims, 9 Drawing Sheets

U.S. PATENT DOCUMENTS

| | | | |
|---|---|---|---|
| 4,979,207 A | 12/1990 | Baum et al. | |
| 4,987,587 A | 1/1991 | Jolissaint | |
| 4,992,940 A | 2/1991 | Dworkin | |
| 5,027,388 A | 6/1991 | Bradshaw et al. | |
| 5,260,866 A | 11/1993 | Lisinski et al. | |
| 5,303,297 A | 4/1994 | Hillis | |
| 5,325,290 A | 6/1994 | Cauffman et al. | |
| 5,359,649 A | 10/1994 | Rosu et al. | |
| 5,381,403 A | 1/1995 | Maher et al. | |
| 5,410,586 A | 4/1995 | Davies | |
| 5,410,589 A | 4/1995 | Galligan | |
| 5,493,490 A | 2/1996 | Johnson | |
| 5,499,357 A | 3/1996 | Sonty et al. | |
| 5,508,999 A | 4/1996 | Cox, Jr. et al. | |
| 5,513,171 A | 4/1996 | Ludwiczak et al. | |
| 5,615,342 A | 3/1997 | Johnson | |
| 5,661,790 A | 8/1997 | Hsu | |
| 5,687,223 A | 11/1997 | Elliott et al. | |
| 5,703,938 A | 12/1997 | Lucas et al. | |
| 5,708,697 A | 1/1998 | Fischer et al. | |
| 5,751,712 A | 5/1998 | Farwell et al. | |
| 5,752,238 A | 5/1998 | Dedrick | |
| 5,768,352 A | 6/1998 | Elliott et al. | |
| 5,809,491 A | 9/1998 | Kayalioglu et al. | |
| 5,828,737 A | 10/1998 | Sawyer | |
| 5,842,178 A | 11/1998 | Giovannoli | |
| 5,914,945 A | 6/1999 | Abu-Amaru et al. | |
| 5,918,213 A | 6/1999 | Bernard et al. | |
| 5,933,481 A | 8/1999 | MacDonald | |
| 5,933,490 A | 8/1999 | White et al. | |
| 5,999,274 A | 12/1999 | Lee et al. | |
| 6,005,926 A | 12/1999 | Mashinsky | |
| 6,011,838 A | 1/2000 | Cox | |
| 6,011,844 A | 1/2000 | Uppaluru et al. | |
| 6,055,227 A | 4/2000 | Lennert et al. | |
| 6,058,260 A | 5/2000 | Brockel et al. | |
| 6,061,556 A | 5/2000 | Rahman | |
| 6,064,653 A * | 5/2000 | Farris | 370/237 |
| 6,075,848 A | 6/2000 | Lunn et al. | |
| 6,122,255 A * | 9/2000 | Bartholomew et al. | 370/237 |
| 6,141,345 A | 10/2000 | Goeddel et al. | |
| 6,151,305 A | 11/2000 | Chen | |
| 6,175,565 B1 | 1/2001 | McKinnon et al. | |
| 6,185,193 B1 | 2/2001 | Kawakami et al. | |
| 6,215,783 B1 | 4/2001 | Neyman | |
| 6,240,463 B1 | 5/2001 | Benmohamed et al. | |
| 6,253,249 B1 | 6/2001 | Belzile | |
| 6,272,126 B1 * | 8/2001 | Strauss et al. | 370/352 |
| 6,275,574 B1 | 8/2001 | Oran | |
| 6,282,267 B1 | 8/2001 | Nolting | |
| 6,332,129 B1 | 12/2001 | Walker et al. | |
| 6,356,628 B1 | 3/2002 | Burke et al. | |
| 6,363,056 B1 * | 3/2002 | Beigi et al. | 370/252 |
| 6,370,120 B1 * | 4/2002 | Hardy | 370/252 |
| 6,385,301 B1 | 5/2002 | Nolting et al. | |
| 6,389,005 B1 * | 5/2002 | Cruickshank | 370/352 |
| 6,426,942 B1 * | 7/2002 | Sienel et al. | 370/235 |
| 6,510,219 B1 | 1/2003 | Wellard et al. | |
| 6,532,235 B1 | 3/2003 | Benson et al. | |
| 6,535,591 B1 | 3/2003 | Galich et al. | |
| 6,556,565 B1 | 4/2003 | Ward et al. | |
| 6,574,216 B1 * | 6/2003 | Farris et al. | 370/352 |
| 6,590,869 B1 * | 7/2003 | Beyda et al. | 370/248 |
| 6,614,780 B2 | 9/2003 | Hakim et al. | |
| 6,618,366 B1 * | 9/2003 | Furukawa et al. | 370/338 |
| 6,618,368 B1 * | 9/2003 | Tanigawa et al. | 370/352 |
| 6,636,486 B1 | 10/2003 | Magloughlin | |
| 6,654,366 B1 * | 11/2003 | Ketcham | 370/352 |
| 6,678,250 B1 * | 1/2004 | Grabelsky et al. | 370/241 |
| 6,751,210 B1 * | 6/2004 | Shaffer et al. | 370/352 |
| 6,870,827 B1 * | 3/2005 | Voit et al. | 370/352 |

OTHER PUBLICATIONS

Markoulidakis, J.G., G. L. Lyberopoulos, M.E. Anagnostou, "Traffic Models for Third Generation Cellular Mobile Telecommunication Systems", Abstract and Introduction, Wireless Information Networks, Issue 4, 1998, also available on the worldwide web at : http://telecom.ece.ntua.gr/~libero/REVIEW3.html, Dec. 1996.

Australian National Audit Office, "Telephone Call Centres Accompanying Handbook, Appendix B: Erlang Formulas for Modeling Incoming Telephone Traffic", available on the world wide web at: http://www.anao.gov/au/bpg_telecentres/telehbk1.html.

Ansapoint Call Center Software, "Call Center Design White Paper", available on the World Wide Web at wysisyg://16/http://www.ansapoint.com/calldesign.html, circa Jan. 1999.

Intel, "Proshare Video Traffic—A Traffic Engineering Model for LAN Video Conferencing", available on the world wide web at http://support.intel.com/support/proshare//8150.htm, circa Jan. 1999.

Kay, Alan S., "Computer Telephony Integration—Supporting Customers—Call Centers are Vital in Building Relationships with Customers", Lantimes Online, Jul. 20, 1998, Issue 1515, published on the world wide web at: http://www.techweb.com/se/directlink.cgi?LAN19980720S0031.

Select Telecom Group, "Free Analysis Form and Customer Profile", circa Jan. 1998, published by the Select Telecom Group on the worldwide web at: http://www.selecttelecom./index.html.

"MCLeod USA Business Services, Fax Packet," believed published circa Feb. 1997.

Clark, David D., "A Taxonomy of Internet Telephony Applications," Internet Telephony Consortium, Massachusetts Institute of Technology, believed published circa 1998.

Terrence P., McGarty, "The Internet Protocol (IP) and Global Telecommunications Transformation," Mar. 1999.

Bailey, Joseph P., et al., "Critical Business Decisions for Internet Services," Information Resources Mgmt. Ass. International Conf., 1998.

McKnight, Dr. Lee W., et al., "Internet Telephony: Costs, Pricing, and Policy," Telecom. Policy Res. Conf., 1997.

Dialogic, an intel Co., "Voice-Enabled Internet Call Centers in the Network," published on the world wide web, circa Jun. 1999.

Ghio, Terri, "The Uncentered Call Center: Building Distrivuted or Virtual Call Centers with CTI and Internet Telephony", Call Center Management Solutions, May 1999, published on the world wide web at: http://www.tmcnet.com/articles/ccsmag/0599/0599cosmo.htm.

Piper Jaffray Equity Research, "IP Telephony", Feb. 1999; USA; see "IP Telephony Environments in the Enterprise" p. 38; "Chapter 5: Enterprise Solutions", p. 71-81; "Business Models", p. 99; "Sidebar: Connecting the IP Telephony World", p. 100-101.

Koph, David, "VOIP: What, me worry?" Jul. 1998, USA, published by Advanstar Communications on the worldwide web at: http://www.americasnetwrok.com/issues/98issues/980715/980715_voip.html.

Lucent Technologies, "Ascend MultiVoice Architecture Strategy From Dial-Tone to Data Tone", Aug. 1998, published by Lucent on the worldwide web at http://www.ascend.com/3156.html.

Cisco Systems Inc., "Cisco Systems and Magellan Network Systems Team on End-to End Voice Over IP Solution", Jun. 1998, USA, published by Cisco on the worldwide web at http://www.precept.com/warp/public/146/june98/22.html.

PSINet, Corp., "Voice: Simplify Your Internal Communication", circa Jan. 1999, USA, published by PSINet on the worldwide web at http://www.psinet.com/applications/datasheets/communicationsvoice.html.

Alcatel USA, "Alcatel Debuts Industry's First Standards-Based Digital Voice and Data Packet Exchange", Jan. 1998, USA, published on the web at: http://www.usa.alcatel.com/press/98press/press33.html.

Higgins, Kelly Jackson, "Voice over IP: The Battle Heats Up", Mar. 1999, USA, published on the web at "TechWeb, The IT Network" at http://www.networkingcomputering.com/1005/1005f1.html.

Lucent Technologies: "Lucent Technologies announces industry's most comprehensive portfolio of Voice over IP network solutions for enterprises", May 1999, USA, published Lucent on the web at http://www.lucent.com/press/0599/990503.nsc.html.

Starvox, "StarVox Provides Virtual Voice-Office Capability with Network Telephony Solutions Suite", Jul. 1998, USA, published by Starvox on the web at http://www.starvox.com/news/pr7-1-99.html.

Starvox, "StarVox Introduces Industry's First Network Telephony Solution", Aug. 1998, USA, published by Starvox on the web at http://www.starvox.com/news/pr8-10-98.html.

Starvox, "Telephony/Data Networking Pioneers form Innovative Software Company", Feb. 1998, USA, published by Starvox on the web at http://www.starvox.com/news/pr2-9-98.html.

PSINET, "PSINet and Wang Global Announce Strategic Alliance for Business Internet Voice Service", Nov. 1998, USA, published by PSINet on the web at http://www.psi.net/news/pr/98/nov2.html.

Peter Bernstein, "Converging Communications Networks: Where Do You Want to be Tomorrow, and How Will You Get There?", Nov. 1998, Published by Lucent Technologies, available on the worldwide web at http://www.ascend.com/.

Information Disclosure Statement Under 37 C.F.R. SEC. 1.97; Filed in U.S. Appl. No. 09/356,287; Dated Sep. 17, 1999.

International Search Report; International Application No. PCT/US00/03445; Mailing Date: Jul. 13, 2000.

U.S. Appl. No. 09/484,094, filed Jan. 18, 2000.

* cited by examiner

METHOD OF PROVIDING INTRA-COMPANY TWO WAY VOICE COMMUNICATIONS OVER A DATA NETWORK

This is a continuation, of application Ser. No. 09/356,287, filed Jul. 16, 1999 now U.S. Pat. No. 6,937,575.

FIELD OF THE INVENTION

The present invention is related to providing voice transmission over data transmission networks. More particularly, the present invention is related to methods for providing voice over internet protocol telephone communications over a data network between remote business locations.

BACKGROUND OF THE INVENTION

The modern day international market economy requires that many business concerns maintain numerous facilities that are often geographically remote. Many times a multinational corporation, for instance, will have facilities in several different countries. In order to efficiently conduct business, communications between such geographically remote facilities must be maintained. These communications may include traditional telephony communications over traditional telephone carrier networks which have a high cost associated with them, and data communications which may be transmitted over a private, intra-company data network at a much lower cost...

Voice over internet protocol ("digital telephony") technology has recently been developed which allows for the reliable convergence of voice and data transmission over a data network. Heretofore, however, the use of such technology by companies for intra-company phone communication has been limited due to the complexity of the methods for converging networks.

For a general summary of the general mechanics of digital telephony formatted communications over a data network, reference is made to "Voice Over Data Network; Frame Relay And ATM" by Lawrence Harte, Published by Apdg. Publishing, 1999, ISBN # 1893970027; herein incorporated by reference.

A heretofore unresolved need therefore exists for a method of providing an intra-company telephony communication over a data network service.

Further, multi-national companies have costly phone bills for long distance phone service for calls made to destinations other than intra-company facilities.

An unresolved need therefore exists for providing a method for reducing company long distance phone charges.

In addition, companies having remotely located facilities often conduct intra-facility one way, two way, or multiple participant video tele-conferences to reduce travel and time expenses. Typically, signals for such video conferences are carried in an analog format over a public switched telephone network ("PSTN"). More recently, video signals for such conferences have been carried over digital networks that are typically administered and provided by third parties, who are often PSTN carriers. In either case, charges for such services from the PSTN can be significant.

A heretofore unresolved need therefore exists for providing a company with lower cost video conferencing ability.

OBJECTS OF THE INVENTION

It is an object of the invention to provide a method for providing an intra-company telephony communication service over a data network between geographically remote company facilities.

It is a further object of the invention to provide a method for providing an intra-company telephony communication service over a data network between remote geographical company facilities for video tele-conferencing capabilities.

It is a still further object of the invention to provide a method for providing reduced phone costs for phone service between a plurality of companies.

It is a still further object of the invention to provide a method for making a phone call between a plurality of companies.

It is a still further object of the invention to provide a method for providing a company having remote geographical locations with reduced long distance phone charges for phone calls made to phones external to the company.

SUMMARY OF THE INVENTION

The present invention comprises a method for providing business entities having remote geographical locations with intra-facility two way telephone communications over a data network.

The present invention takes advantage of digital packet based two-way voice communications methods as are generally known in the art. As used herein, reference to "digital telephony format" is intended to refer to this technology, and is not intended to limit the application of the invention to one particular digital packet based voice communication format. "Digital telephony" format is intended to refer to any packet based voice transmission technology wherein voice data is broken down and assembled into discrete digital "packets" for transmission over a data line, and reassembled at the receiving end. The dialed phone number is converted to indicate a unique digital address to determine the desired destination phone. Digital telephony is contrasted with traditional analog circuit switched telephone communications, where a dedicated transmission line is provided to transmit the call.

Recently, a widely accepted industry standard for digital telephony format has emerged in the form of the International Telecommunications Union's ("ITU") H.323 standard. This format is a preferred format for the practice of the present invention. It will be appreciated by one skilled in the art, however, that the advantages realized through practice of the present invention do not depend on the particular digital telephony format utilized, and that the present invention is not limited to any particular format.

Method for Intra-Facility Phone Communications Over a Data Network:

The present invention generally comprises a method of providing an intra-company voice communication service for a company that has a plurality of remote geographical facilities, a plurality of interconnected phones at each of the facilities, and an intra-company data network connecting the facilities. The method comprises the general steps of determining a call traffic pattern for each of the remote facilities, comprising the duration, cost, and peak number of phone calls made between each facility and all other of the facilities for a selected time period; determining performance specifications of the data network comprising available network bandwidth between the facilities; using the call traffic pattern and the network performance specifications to design a digital telephony solution for the company comprising required network bandwidth between each of said facilities, specifications for a digital telephony gateway at each of the facilities that interfaces the data network and the plurality of interconnected phones at each facility; and implementing the solution by installing the gateways at each of the company facilities, connecting the gateways to the data network and to the plurality of interconnected phones at each of the facilities, and programming the digital telephony gateways to transmit and receive intra-company phone calls over said data network.

Preferably, the step of determining the call traffic pattern further comprises programming a computer to accept as input an industry standard call detail record, analyze the call detail record to determine which of the data in the record corresponds to telephone calls made between intra-company facilities, and to output a file that identifies the calls made from each of the facilities to any of the other facilities. It is noted that as used herein, the term "computer" is intended to generally refer to machines having a programmable central processing unit ("CPU"), with common examples comprising a personal computer, programmable modules, mainframe computers, hand held programmable personal organizers, and programmable controllers.

In the preferred step of determining a call traffic pattern, the computer of the present invention embodiment is programmed to allow a user to identify any of the plurality of facilities and to obtain a record of calls from that facility made to all or any specified of other intra-company facilities. In addition, the computer is programmed to output of a file corresponding to calls between any specified combination of facilities.

As the call traffic pattern determining step may require obtaining data from and reporting output to a plurality of remote geographical company facilities, the computer may further be connected to the World Wide Web and programmed to operate over the web. In this manner time and travel expense savings may be realized, as data may be input from and output sent to the remote geographical facilities.

Preferably, the step of determining data network performance specifications comprises determining a variety of performance and capacity specifications for the data network. Specifications may include, but are not limited to, the type of connectivity between the remote geographical facilities, peak and average values of percent utilization of bandwidth, and average and peak data transmission delays over the network. In addition, the determination of such information may comprise providing a questionnaire (organized set of questions) over the World Wide Web and receiving answers to the questionnaire over the World Wide Web. As such questions and answers may be required at each of the plurality of remote geographical facilities, this can realize significant time and travel savings.

The step of designing a digital telephony solution of the method generally comprises providing a converged network architecture "blueprint" that specifies hardware, software, connectivity, and other requirements. Preferably, the solution is accessible over the World Wide Web. As the solution represents a work product and intellectual property of significant value, it is most preferably provided in a password secured limited access format for tight control of its dissemination.

Method for Providing Video Communication:

Another embodiment of the method of the invention further comprises the steps of generally providing at least a video camera at a first of the facilities and at least a video monitor at a second of the plurality of intra-company facilities. The gateways at the first and second facilities interface between the camera and the network, and the monitor and the network, respectively. In addition to performing the functions of the gateway as described above, this presently provided gateway further has means for converting between an analog video signal standard format, such as NSTC or PAL, and a digital video signal and transmitting and receiving the digital signals over the digital data network. A unique digital address is assigned to each of the cameras and monitors. A digital video controller is provided and connected to the data network to control the video traffic between the camera and monitor. Through this embodiment of the method of the invention, intra-company video-teleconferences may be conducted between remotely located intra-company facilities without utilizing any public switched telephone network carriers and without encountering any associated charges.

It is noted that the term "Public Switched Telephone Network" ("PSTN") as used herein generally refers to public carriers and providers of phone service, whether they be local, long distance, or international. Specific PSTN examples include such well known examples as MCI Worldcom, AT & T, Sprint, Bell-South, NYNEX, Ameritech, and PacTel. Also, terms will be used herein which are intended to refer to sub-categories of PSTN's, including "local exchange carrier" ("LEC"), "long distance carrier" ("LDC"), and "international exchange carrier" ("IXC"). As used herein, any of an LEC, LDC, and/or an IXC may be considered to be PSTN's; LEC's can be thought to comprise local PSTN's that are interconnected by LDC's or IXC's. Thus, for example, a call from a Chicago residence phone may be carried by a LEC to an IXC and then routed over the IXC to a London LEC for ultimate delivery to a London residence phone. As specific examples, Ameritech in Chicago is an LEC, while Sprint and MCI Worldcom may be considered examples of LDC's and IXC's.

Method for Providing External Calls Over a Data Network:

In another embodiment of the method of the invention, additional method steps comprise programming at least a first of the digital telephony gateways as provided above to interface with a public LEC external to the respective facility, whereby the gateway may route an outgoing standard analog phone signal to a phone external to the facility. A digital telephony format telephone signal may then be transmitted over the digital network to the first gateway, converted to standard analog telephone format with the first gateway and transmitted to a phone external to the first facility over the public LEC carrier.

In this manner, a caller from a remotely located company facility may place a call to a phone external to a second of the company's facilities over the company data network without any IXC/LDC related charges. Charges to the company will instead only be the LEC charges associated with carrying the call from the second facility to the external phone. As an example, a company facility in Chicago could call a vendor in London by dialing a code which accessed the company data network to connect the call to the London facility over the company data network at no charge, and then have the call routed from the London facility to the London vendor external to the London facility. The only charges for the call from Chicago would be associated with the public LEC carrier in London. Great economic savings are thereby realized by avoiding any IXC or LDC services and charges.

Additional preferred steps of this embodiment of the method of the invention extend upon the embodiment described above. These additional steps comprise programming the second gateway at the company second facility to interface with a second LEC external to the second facility and assigning a public phone number to the second gateway, whereby the second gateway may be accessed by a standard analog phone signal originating from a phone external to the second facility. Thus the second gateway may be accessed with a standard analog telephone signal from a phone external to the second facility over the second LEC, the standard analog phone signal converted with the second gateway to digital telephony format, the digital telephony signal transmitted over the data network to the first gateway, converted with the first gateway to a standard analog telephone signal, and finally transmitted from the first gateway to a phone external to the first facility over the first LEC.

Thus, taking the previously described Chicago to London example, further assume that a company facility in Milwaukee that is not connected to the intra-facility data network needs to contact the London vendor by phone. As a result of the this embodiment of the method of the invention, a phone call could originate at the Milwaukee facility, be transmitted to the Chicago company facility by an LEC (or an LDC), be converted to digital telephony format and transmitted over the intra-company data network to the London facility, and finally be converted and routed from the London company facility to the London vendor external to the London facility over the first LEC. Net charges for the call would include only the LEC charges for the Milwaukee to Chicago linkage (which may comprise two or more separate interconnected LEC's) and for the London facility to London vendor LEC charges. This offers substantial savings over the long distance and IXC charges that would be billed for a direct call from the Milwaukee facility to the London vendor.

Method for Providing a Multiple-Company Network

Still another embodiment of the invention comprises a method of providing reduced cost phone service to businesses, wherein the businesses comprise first and second companies each having a respective plurality of geographically remote facilities, a plurality of phones at each of the facilities, data networks linking the remote facilities, and a digital telephony gateway at each of the facilities interfacing the plurality of phones with the data network. Intra-facility phone calls may be carried over the data network in digital telephony format within each of the two companies.

Additional steps of the method of the invention then comprise connecting the first company's data network with the second company's data network whereby telephone calls between any of the first company facilities may be made to any of the second company facilities over the interfaced networks in digital telephony format. Individual calls are made in the same manner as generally described above for the method of the invention that comprises only a single company and network.

With this inter-connected multi-company embodiment of the invention, a caller from a first company facility may place a call to a second company facility over the respective interfaced company networks without ever being subject to PSTN charges. As an example of the usefulness of this invention embodiment, significant savings can be realized by two companies having a close relationship (such as a supplier and customer, for instance) wherein multiple worldwide facilities of each company are required to regularly contact various of one another.

Further, it will be appreciated that this embodiment of the invention is not limited to a first and a second company, but may be practiced by any number of interconnected companies as may be practically valuable.

A preferred embodiment of this method of the invention will comprise interfacing at least one of the first company gateways with a LEC external to the first company facility, whereby that gateway may route a telephone signal received over the interfaced data networks from any of the other first of second company facilities to a phone external to that first facility. It will be seen that this preferred embodiment of the method of the invention that in addition to the advantages as outlined generally above, also allows for a phone call to be made from a second company facility over the interfaced networks to a phone external to the first company facility. Thus significant savings are realized by avoiding IXC/LDC carrier charges.

Finally, in addition to the steps just described, additional preferred steps comprise interfacing the gateway at the second company facility with a LEC external to the facility and providing the gateway with a public phone number. A call may thereby be made over the LEC from a phone external to the second company facility into the second location gateway, converted to digital telephony format, transmitted over the interfaced networks to the first company facility gateway, converted with the first gateway to standard analog format; and finally transmitted to a phone external to the first facility over the first LEC.

An advantageous result is thus realized whereby two companies may enjoy the benefits of placing a call from a phone external to one of the first company facilities to a terminal phone external to a facility of the second company without any IXC/LDC charges. The charges for the call will instead only total the sum of the LEC charges at the originating location and terminating facility.

Further, it will be understood that this embodiment of the invention is also not limited to two companies, and that benefits realized will significantly grow as additional companies are interfaced, with a far reaching "virtual network" thereby created.

Finally, it will be appreciated that the interfaced company embodiments of the method of the invention as generally described above may further comprise steps for providing video tele-conferencing as was discussed above with reference to a single company.

Method of Making a Phone Call:

The present invention further comprises a method of making a phone call between companies, with each company having a phone, a digital telephony gateway, a data network, and with the company networks connected to one another. The method comprises the steps of generating a standard analog phone signal from a first company phone; converting the analog signal with the first company digital telephony gateway to digital telephony format; transmitting the digital telephony signal over the connected first company and second company data networks to the second company digital gateway; and converting the digital telephony signal with the second company gateway to standard analog format; and transmitting the standard analog signal to a phone at the second company.

Further, the present invention comprises a method of making a telephone call between two phones, wherein a company has first and second facilities, a digital telephony gateway at each facility, a public switched telephone network external to each facility, a data network connecting the facilities. The method comprises the steps of generating a standard analog phone signal from a first phone, transmitting the standard analog phone signal to a company first facility over a public switched telephone network; converting the standard analog signal with the first facility digital telephony gateway to digital telephony format; transmitting the digital telephony signal over the company data network to a the second facility; converting the digital telephony signal with the second facility gateway to standard analog format; and transmitting the standard analog signal to a second phone external to the second facility over a public switched telephone network.

Finally, the present invention further comprises a method of making a telephone call between two phones, wherein a plurality of companies each have a digital telephony gateway and a data network, with the respective company networks connected to one another, and a public switched telephone network external to each of the companies. The method comprises the steps of: generating a standard analog phone signal from a first phone, transmitting the standard phone signal to a first company over a PSTN; converting the standard signal with a first company digital telephony gateway to digital telephony format; transmitting the digital telephony signal over the interconnected company data networks to a second company; converting the digital telephony signal with a second company gateway to standard analog format; and transmitting the standard analog signal to a second phone external to the second company over a PSTN.

The various embodiments of the invention as claimed herein will be described in greater detail below. The above brief description sets forth rather broadly the more important features of the present disclosure so that the detailed description that follows may be better understood, and so that the present contributions to the art may be better appreciated. There are, of course, additional features of the disclosure that will be described hereinafter which will form the subject matter of the claims appended hereto. In this respect, before explaining the several embodiments of the disclosure in detail, it is to be understood that the disclosure is not limited in its application to the details of the construction and the arrangements set forth in the following description or illustrated in the drawings. The present invention is capable of other embodiments and of being practiced and carried out in various ways, as will be appreciated by those skilled in the art. Also, it is to be understood that the phraseology and terminology employed herein are for description and not limitation.

DETAILED DESCRIPTION

Figure 1:
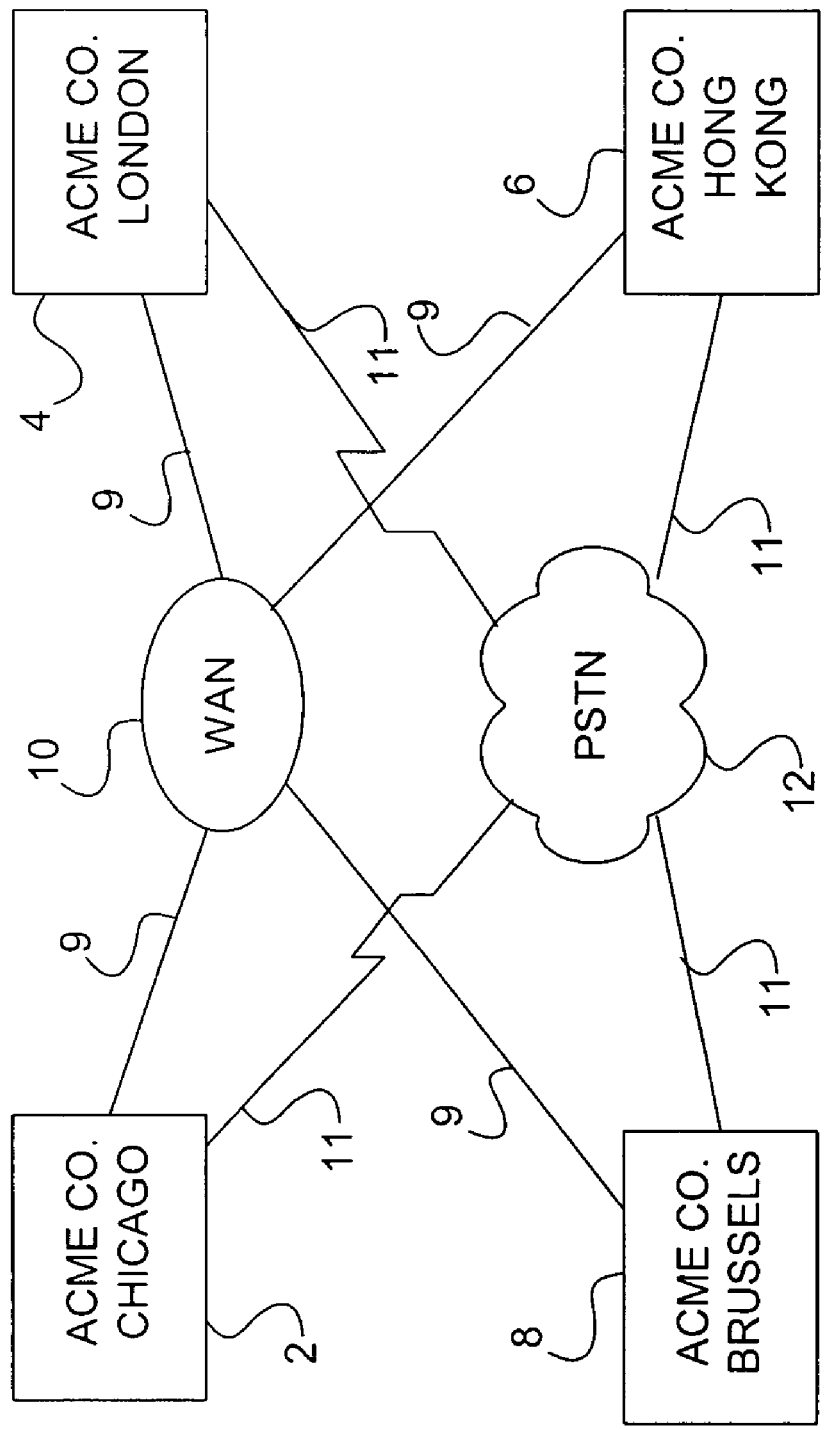
FIG. 1 is a general schematic illustration of an example company having various facilities and communications networks.

By way of example, a preferred embodiment of the present method for providing an intra-company telephone communication service invention will be herein described through its application to the multi-national "Acme" corporation. Turning now to the drawings, the first step of the method of the invention comprises providing a company with a plurality of geographically remote located facilities. FIG. 1 shows a general intra-company communications schematic diagram for the "Acme" corporation having four geographically remote locations, comprising a Chicago facility 2, a London facility 4, a Hong Kong facility 6, and a Brussels facility 8.

Each of the facilities 2, 4, 6, and 8 is linked by a digital connection 9 to data network 10, which may comprise an ethernet wide area network ("WAN"), for instance. As used herein, the terms "data network", "digital data network", and "WAN" are intended to be interchangeable, and refer to a digitally interconnected computers or other digital devices as are generally known in the art. WAN 10 provides for digital data communication between facilities 2, 4, 6, and 8. WAN 10 may comprise, for example, a network of leased fiber optic communication cables. Each facility 2, 4, 6, and 8 is also linked for communicating over the phone by traditional phone lines 11 to a public switched telephone network carrier 12 ("PSTN"). As will be appreciated by one skilled in the art, PSTN 12 is significantly more complex than illustrated in FIG. 1 (and other Figs. herein). PSTN 12 is intended to comprise, for example, an interconnected combination of public telephone carriers at the LEC, LDC, and IXC levels such as Ameritech, AT&T, Sprint, MCI Worldcom, NYNEX, or other public carriers as are generally known.

Figure 2:
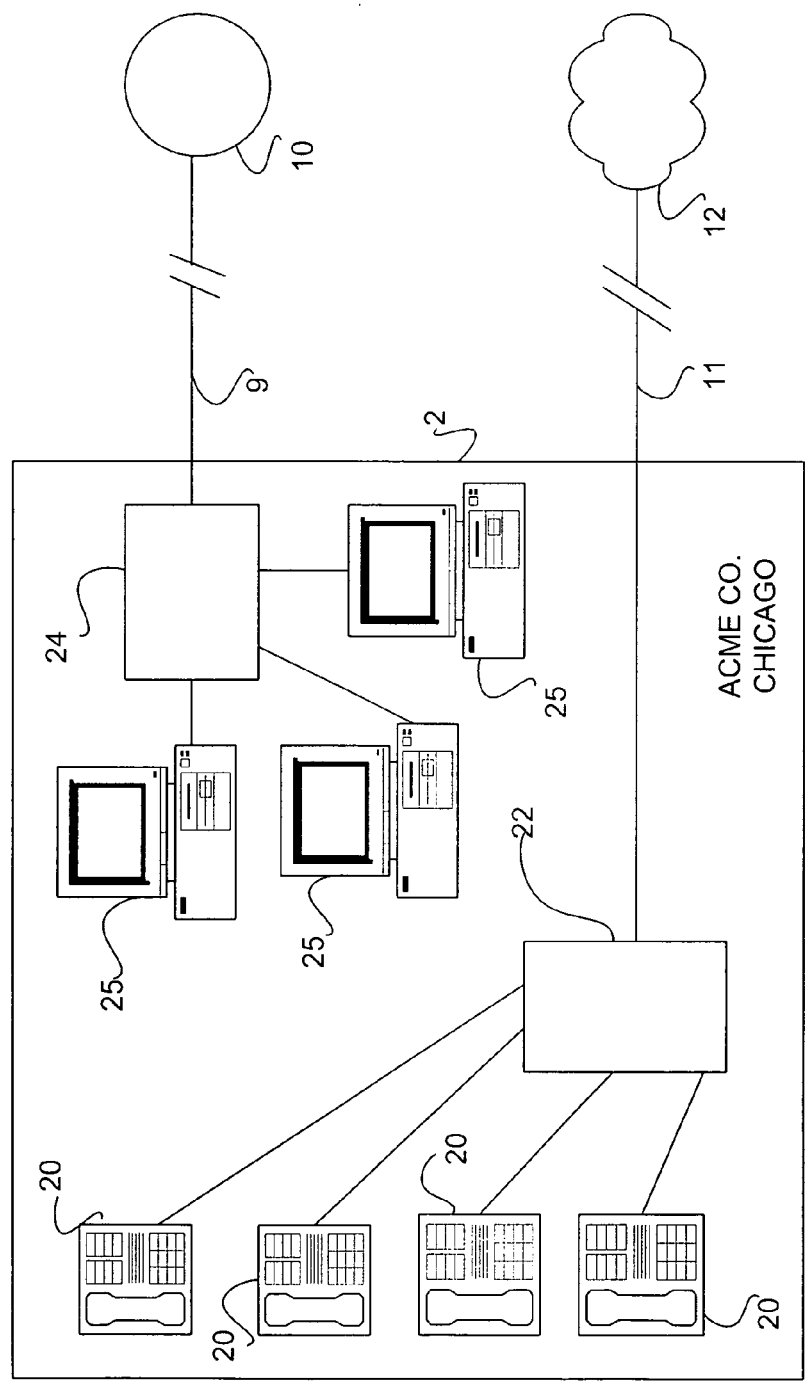
FIG. 2 is a general schematic illustration of one of the example company facilities of FIG. 1.

FIG. 2 illustrates a schematic communications diagram for one individual of the plurality of remote geographical facilities 2, 4, 6, and 8 of FIG. 1. Although FIG. 2 is labeled to illustrate the Acme Chicago facility 2 of FIG. 1, it is intended to be generally representative of any of the facilities 2, 4, 6, or 8 of FIG. 1. Referring again to FIG. 2, facility 2 has a plurality of individual phones 20 all interconnected over a phone network which is switched within switch 22, which may comprise, for example, a PBX switch as is generally known. Switch 22 is then connected to PSTN 12 for phone communication by traditional phone cable 11, which may for example comprise a PBX trunk. Facility 2 also has network router 24 connecting to and directing digital data over WAN 10 over digital connection 9. Router 24 may, for instance, be connected to a plurality of computers 25 at facility 2.

Figure 3:
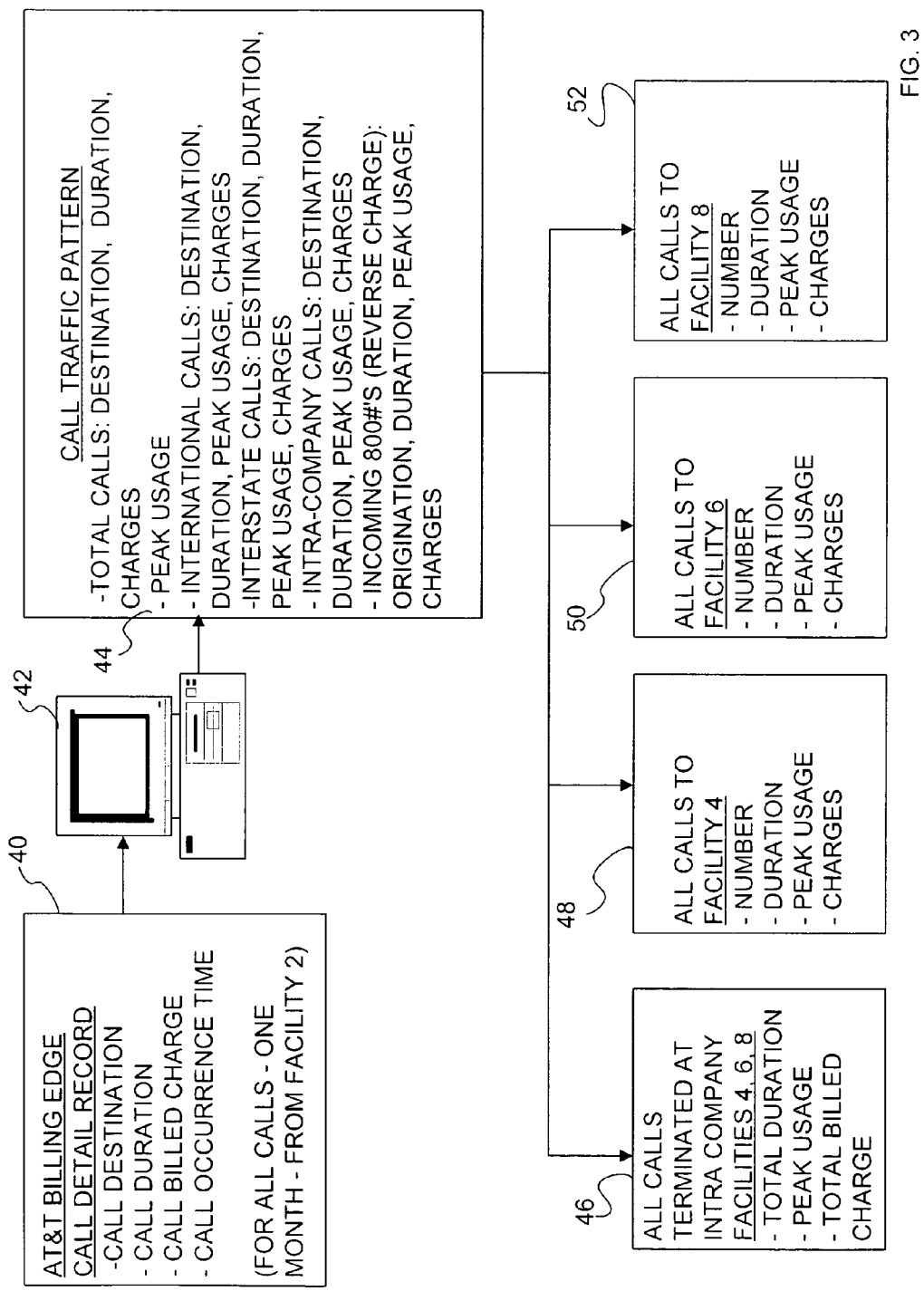
FIG. 3 is a general schematic illustration various elements of a preferred step of determining a call detail record of the invention.

The next step of a preferred method of the invention comprises determining a call traffic pattern for each of the facilities 2, 4, 6, and 8 of FIG. 1. FIG. 3 schematically illustrates general portions of the preferred call traffic pattern determination of the invention. A call detail record 40 is provided which generally represents a "digital phone bill" for a given facility 2, 4, 6, or 8. Call detail record 40 is preferably in the format of an industry standard, which may comprise, for example, Sprint, MCI Worldcom, or AT&T format. As an example, AT&T detail records are available to their customers in CD format under the name "AT&T Billing Edge". Detail record 40 comprises a record of all calls made for a time period (e.g. a month), and may comprise each individual call's destination number, time duration, and associated billed charge for all calls from facility 2 of FIG. 1. Similar call detail records are provided for facilities 4, 6, and 8 of FIG. 1. As the general steps of the method of the invention with respect to any of the call detail records are identical, however, only detail record 40 from facility 2 is illustrated.

Referring again to FIG. 3, computer 42 is programmed to receive detail record 40 as input, to analyze detail record 40, to extract particular data therefrom, and to thereby determine call traffic data pattern 44. Preferred call data traffic pattern 44 comprises a main set of organized data 46 comprising:

- total calls: destination number, duration time, and charges
- instantaneous peak call usage (e.g.—peak number of phone lines used at any one time)
- international calls: destination number, duration time, instantaneous peak call usage, and charges
- interstate calls: destination number, duration time, instantaneous peak call usage, and charges
- intra—company calls: destination number, duration time, instantaneous peak call usage, and charges
- incoming 800# (or other reverse charge) calls: number, duration time, instantaneous peak call usage, and charges "Peak call usage" refers to the peak number of calls occurring at any given time (e.g. 163 calls occurring at 12:15 PM on a given date). Of particular interest within call traffic pattern 44 are intra-company calls (calls from facility 2 that terminate in any of the other intra-company facilities 4, 6, or 8 of FIG. 1). These call data are further broken down into subsets showing calls between particular facilities: set 48 comprises call duration, cost, and peak usage for calls from facility 2 to facility 4; set 50 comprises call duration, cost, and peak usage for calls from facility 2 to facility 6, and set 52 comprises call duration, cost, and peak usage for calls from facility 2 to facility 8.

Preferably, computer 42 is connected to the World Wide Web, so that input 40 and output 44 may be provided over the web. As detail records 40 are collected from a plurality of remote geographical locations and output may be requested and sent to any or all of these locations, connecting computer 42 to the web provides for valuable time and travel savings.

In an additional preferred step of the method of the invention, a price for the digital telephony solution may be calculated using call traffic pattern 44. It has been discovered in practicing the method of the invention that the value of the solution provided is directly proportional to the costs that will be eliminated through the solution. It has further been discovered that an efficient manner in which to establish a price for the solution of the invention is to base it on the call traffic pattern 44. As an example, a service price may be based on the cost savings provided by eliminating total intra-company billed phone charges of set 46 for all facilities for a 12 month period. The calculated service price may comprise a sum of all the individual prices for each of facilities 2, 4, 6, and 8; further, the price may be broken down to include only any single or combination of facilities 2, 4, 6, and 8 of FIG. 1.

Most preferably, the method of the invention comprises the additional step of programming a computer to perform such a price determining calculation. The computer is connected to the World Wide Web, and may comprise computer 42 of FIG. 3. A user may thereby access computer 42 over the web from a remote geographical location, input a call detail record 40, and have output a price for the service of the invention.

An additional step of the method of the invention comprises determining performance specifications for WAN 10. Such performance specifications generally comprise determination of transmission delay, average and peak values for packet loss, and peak and average bandwidth usage over WAN 10. Other factors may comprise the type of WAN 10 connectivity existing between each of facilities 2, 4, 6, and 8; examples of which are, for instance, dedicated point to point, frame relay with physical access speeds, or asynchronous transfer mode ("ATM"). Still other factors comprise WAN router 24 (FIG. 2) protocol, and the existence and form of prioritization used by each or any router 24.

In order to determine some of these performance specifications, physical tests of the network may be performed, such as what is known in the industry as a "ping" test, wherein a digital signal is sent back and forth over the network with travel time and packet loss measured over the trip. Other portions of this step of the invention may be determined by obtaining information from each of the remotely located facilities. These portions may preferably be carried out over the World Wide Web by providing a formatted questionnaire to be viewed and responded to. This realizes considerable time and travel related savings.

WAN 10 physical performance specifications and the call traffic pattern 44 are analyzed to determine whether WAN 10 is capable of carrying intra-company digital telephony signal traffic. As an example, each call may be anticipated to require 10 Kbytes of network bandwidth. Minimum available network bandwidth between each facility is therefore compared with peak instantaneous calls between facilities×10 Kbytes to determine if sufficient WAN 10 bandwidth is available. A safety factor of 50% is preferably incorporated, so that the network has sufficient bandwidth available to carry 150% of predicted peak usage. It has also been discovered that to effectively carry digital telephony format signals, packet loss should preferably comprise less than 7%, and total delay time should preferably comprise less than 250 ms. Above these levels, it has been discovered that the quality of voice communication over WAN 10 is perceived by a user to be less than that of standard analog telephony.

Should it be discovered that WAN 10 does not have sufficient bandwidth to carry the intra-company digital telephony signals, or that unacceptable levels of packet loss or delay across WAN 10 are occurring, WAN 10 must be "tuned" to perform to satisfactory levels. "Tuning" as used herein may comprise, by way of example, adding bandwidth where required to meet requirements, and/or programming routers 24 to perform prioritization as is generally known in the art, whereby digital telephony signal traffic may be given a higher priority than other digital traffic. Further, a "firewall server" will frequently exist on WAN 10 on connection 9 for filtering unwanted traffic from each facility 2, 4, 6, and 8. As used herein, "firewall server" is used to refer to a computer or other processor programmed to provide network security by selectively allowing network traffic to pass, as is generally known in the industry. Firewall servers may contribute to delay in digital telephony transmissions. In this case, tuning may further comprise speeding firewall performance by methods as may be known in the art, including replacement of the firewall server with a server having a faster CPU.

The method of the invention may also preferably includes a step comprising tuning the gateway 60 interface with PBX switch 22 at each facility 2, 4, 6, and 8. By way of example, tuning of this interface may comprise adjusting gateway 60 output levels (in dB) to eliminate echo at phones 20.

The method of the invention further comprises using the call traffic pattern 44 and the determined network performance specifications to first design and then to implement an intra-facility digital telephony solution. The digital telephony solution may be generally thought of as a complete converged network architecture "blueprint", generally comprising hardware and software specifications for interfacing standard phones 20 with intra-facility WAN 10. The solution comprises specifications for digital telephony gateways to be provided at each facility 2, 4, 6, and 8. The gateways, as will be discussed below, are preferably commercial digital telephony conversion and networking modules that are available from a variety of vendors. The gateways may be referred to by those skilled in the art as "coder/decoder" modules, or "codec" modules. Depending on the determined network specifications, a particular gateway may be chosen. Preferred commercial examples of suitable gateways comprise the "Internet Voice Gateway" available from the Oki Network Technologies Corp., a 2600 or 3810 model from Cisco Systems Corp., "Vanguard" from Motorola Corp. in Schaumburg Ill., "Total Control Hub" from 3Com Corp. in Skokie, Ill. These preferred commercial examples all comprise means for converting analog phone signals to H.323 standard digital telephony signals. The gateways further comprise a plurality of telephone ports for connection to PBX 22, a network port for connection to router 24, and an IP protocol address database for performing the directory server function discussed above.

The preferred solution of the method of the invention further comprises programming the gateways to transmit digital telephony format signals over a dedicated portion of the network bandwidth. The solution also comprises a scheme for assigning each of the plurality of phones at each of the facilities 2, 4, 6, and 8 with a unique digital address. A directory server is interfaced with WAN 10 to cross reference each individual phone 20 with a unique digital address. Preferably, a duplicate directory server function is incorporated in each gateway. Once implemented, the solution of the invention will allow for transmission of voice communication via telephone between facilities over the data network, thereby eliminating public telephone carrier related charges for such calls.

The digital telephony solution of the invention represents the product of considerable time and effort, and thereby has considerable economic value. Also, it may be provided for only some of the intra-company facilities with others excluded. As an example, the call traffic pattern 44 of FIG. 3 may indicate that only a limited number of intra-company calls are placed from and to facility 6 of FIG. 1. Under these circumstances, for cost efficiency the digital telephony solution of the invention may specify configuring only facilities 2, 4, and 8 to carry digital telephony communications with facility 6 excluded.

Again referring to the schematic of FIG. 1 as an example, as a provided solution will generally be applicable to any of the facilities, there is a considerable business risk that the Acme company could utilize the provided design to configure facility 6 on its own. To minimize this business risk, a preferred step of providing a digital telephony solution further comprises providing such a solution as a license agreement. The extent of the allowed implementation of the design may thereby be tightly controlled. Further, providing the solution as a license offers additional advantages, including tighter control over Acme's allowed modifications of the design once implemented.

In addition, a preferred embodiment of the method of the invention further comprises providing the solution over the World Wide Web in a password secured, access limited format. As the solution will need to be reviewed and implemented at a plurality of remote facilities, placing it on the web offers considerable time and travel savings. Password secured, limited access format controls the dissemination of the economically valuable design.

Figure 4:
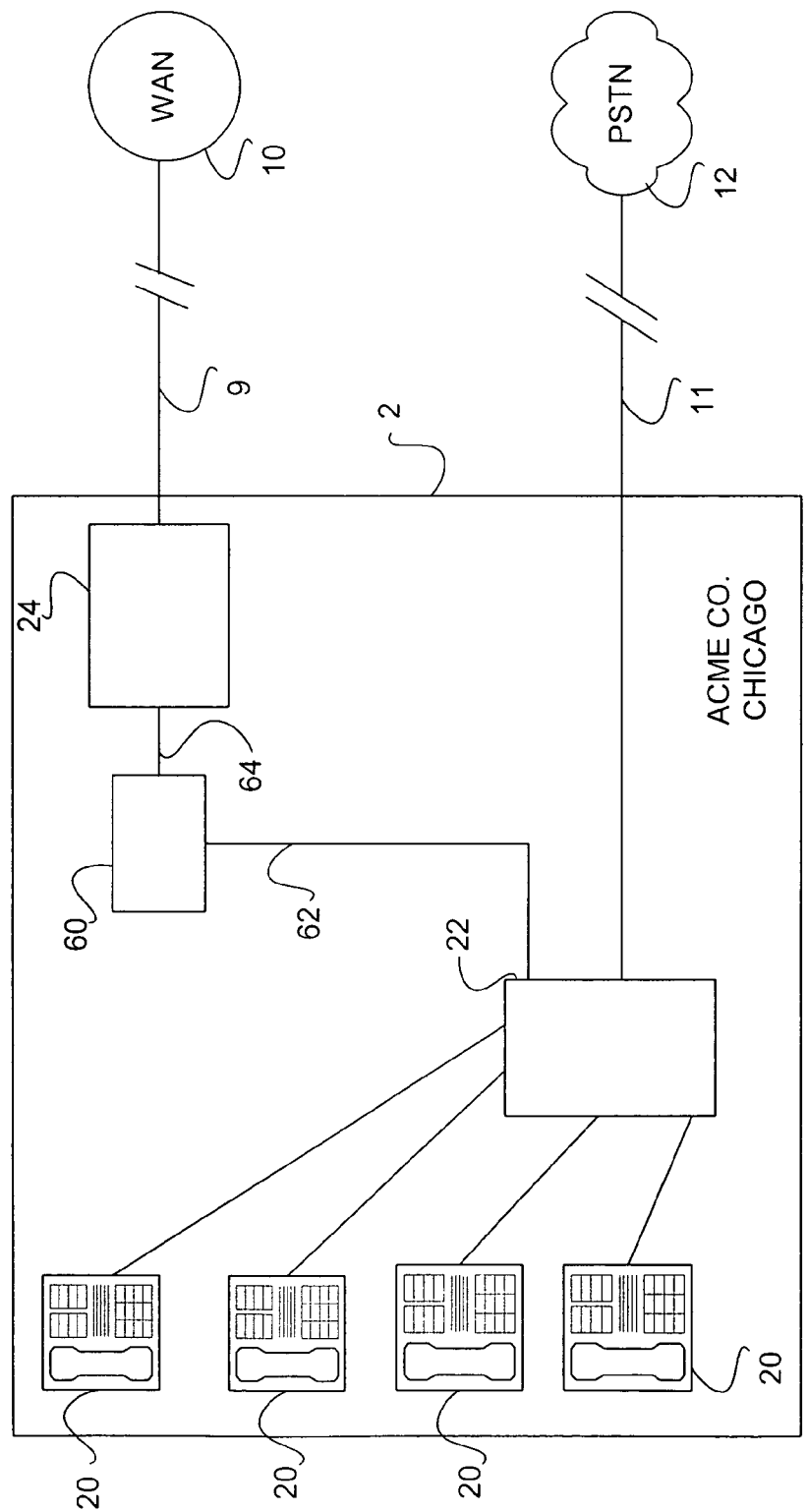
FIG. 4 is a general schematic illustration of one of the example company facilities of FIG. 1 with a portion of a preferred digital telephony solution of the invention implemented.

FIG. 4 provides a schematic representation of a portion of a solution that has been implemented at facility 2 of FIGS. 1 and 2. As discussed above, the designing and implementing of the solution comprises specifying and installing a digital telephony gateway 60 to interface between individual phones 20 and WAN 10. Gateway 60 preferably comprises a commercially available digital telephony gateway module, as discussed above. Gateway 60 performs a codec function, and generally comprises a digital telephony chipset for converting between standard analog telephone signals and digital telephony format signals. Gateway 60 is linked to standard PBX switch 22 with linkage 62, and to router 24 with linkage 64.

The preferred digital telephony solution that is provided and implemented through the method of the invention further comprises programming each switch 22 to recognize a code, such as a particular dialed prefix number (e.g., "7"), on a call made from any phone 20 as indicating an intra-company call destined for another facility. Switch 22 is further programmed to send a signal corresponding to such a call across linkage 62 to gateway 60, where the standard analog format signal is converted to digital telephony format. Within the method of the invention, gateway 60 has been programmed to access its directory server function to cross reference the dialed phone number with a unique digital address for the destination facility and individual phone. A directory server may also of course comprise a stand alone module anywhere on WAN 10, but preferably comprises an internal storage function on each individual gateway 60. Gateway 60 sends the converted digital telephony format signal over linkage 64 to router 24 in packet form to establish two way voice communication with the desired destination phone over WAN 10, thereby bypassing PSTN 12 and its associated charges.

On the receiving end, an incoming digital telephony format signal that has been sent from another facility (as generally described above) is received over WAN 10 at facility 2 by router 24 of FIG. 4. The preferred solution implementation of the invention further comprises programming router 24 to recognize such a digital telephony format signal as an intra-facility telephone call to be forwarded over linkage 64 to gateway 60. Gateway 60 converts the signal from digital telephony format to a standard analog telephone signal by re-assembling the packet based transmission, converts the internet protocol address to a standard analog destination recognized by switch 22, and links it over linkage 62 to switch 22. Switch 22 then treats the signal in the same general manner as it would an incoming standard call from PSTN 12 over link 11, ringing the desired destination phone 20 and establishing a two way voice linkage.

In this manner the method for providing an intra-company telephone communication service of the invention provides for the realization of a converged digital telephony and data intra-company network that provides valuable cost savings as public carrier charges for intra-company phone calls are eliminated. Further, digital telephony two-way communications, because of their digital nature, provide for a quality of call that is superior, particularly over long geographic distances, than does standard analog phone service.

As has been generally described herein, a preferred embodiment of the invention comprises utilizing the World Wide Web to carry out various of the steps of the invention. By way of summary, these steps may result in the creation of a collection of connected World Wide Web pages that provide an organized, convenient, and easy access to the practice of the method of the invention. The preferred web pages have a network performance questionnaire to be replied to by a subject company, and in particular to be replied to by each of a plurality of a company's remote geographical facilities. Also, a call detail record may be submitted over the web for each individual facility.

With the call detail record and replies to the network performance questionnaire, a digital telephony solution can be specified and priced using the respective steps of the invention as discussed above, with resultant design and pricing transmitted through a separate, access limited web page. This provides for considerable time and cost savings, as numerous visits, phone conversations, and other communications with a plurality of remotely located geographical locations are thereby eliminated. In particular, such web based communication allows for many portions of the method of the invention to be carried out in a time period of minutes or hours as opposed to days or weeks. This is an important advantage of the preferred method of the invention.

Figure 5:
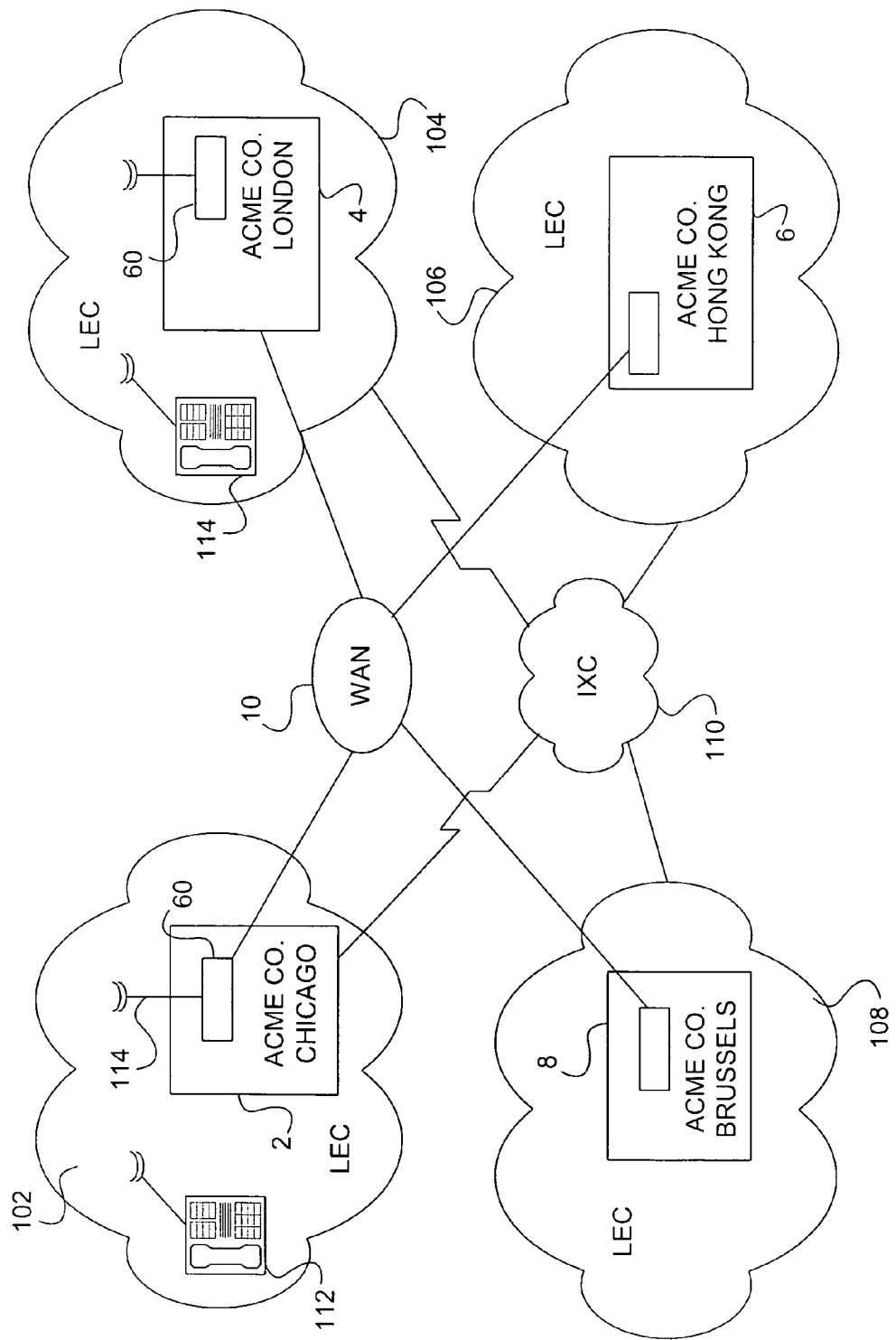
FIG. 5 is a general schematic illustration of the example company of FIG. 1 with a LEC external to each of the plurality of facilities shown.

Method for Providing External Calls Over a Data Network:

In an additional embodiment of the method of the invention, each of the Acme facilities 2, 4, 6, and 8 have a LEC 102, 104, 106, and 108, respectively, external to them providing public phone service as generally and schematically illustrated in FIG. 5. The LEC carrier has been schematically illustrated in FIG. 5 in a cloud shape, this is intended to illustrate the generally large, far reaching, and richly interconnected nature of such systems, as generally discussed above. Such LEC carriers offer phone service to the public, and may comprise, by way of example, the Ameritech Co. in Chicago. Each of LEC 102, 104, 106, and 108 may provide phone service over their network to a region that includes a single or a plurality of area codes. Further, these LEC's provide access to other LEC's and are interconnected by LDC's and IXC's, as is generally illustrated as 110 in FIG. 5. In this sense, any of LEC's 102, 104, 106, 108, and IXC 110, either alone or in combination, may be considered to generally comprise PSTN 12 of FIG. 1.

This embodiment of the method of the invention comprises additional steps of programming at least a first gateway 60 at a first facility 2 to access LEC 102 whereby gateway 60 may connect an outgoing standard analog format telephone signal to a phone 112 external to facility 2 over LEC 102. FIG. 5 illustrates a direct connection 114 from gateway 60 to LEC 102. With reference to FIG. 4, however, it is noted that gateway 60 may be interfaced with an LEC 102 through switch 22 interconnecting phones 20 as switch 22 is already connected to PSTN 12 (which as discussed above may be considered to comprise LEC 102 of FIG. 5).

Through practice of this embodiment of the method of the invention, a digital telephony format telephone signal may thereby be transmitted from any second gateway, taking gateway 60 of facility 4 as an example, over WAN 10 to gateway 60 of facility 2. The incoming digital telephony signal may then be converted to a standard analog phone signal with gateway 60 at facility 2, and transmitted to phone 112 external to facility 2 over LEC 102. Thus the Acme Co. would be able to place a call from facility 4 in London to phone 112 in Chicago that is external to facility 2 without utilizing IXC 110. Significant savings are thereby realized.

More preferably, in addition to programming gateway 60 of facility 2 to route an outgoing standard analog phone signal to external phone 112 over LEC 102, a second gateway at another facility is preferably programmed to accept incoming calls. Additional preferred steps of the this embodiment of the method of the invention comprise programming gateway 60 of facility 4 to interface with LEC 104 and assigning a public phone number to gateway 60 whereby it may receive an incoming standard analog phone signal from external phone 114 over LEC 104. Gateway 60 of facility 4 may thereby be accessed with a standard analog phone signal from phone 114 over LEC 104, convert the standard analog signal to digital telephony format, and transmit the digital telephony format signal over WAN 10 to gateway 60 at facility 2 for conversion and transmission to external phone 112.

Preferably, all of the plurality of intra-company facilities gateways are programmed to interface with respective LEC's to both receive incoming phone signals from external phones and connect outgoing phone signals to external phones. This results in the creation of a "virtual" phone network of largest penetration.

Practice of this embodiment of the method of the invention thereby results in the Acme Co. being able to place a call originating from a phone 114 external to facility 4 to a phone 112 external to facility 2 without requiring the services of IXC 110. The Acme Co. thereby realizes significant savings when, for instance, an office phone 114 that is external to facility 4 but within the LEC 104 coverage is used to contact a vendor phone 112 that is external to facility 2 but within LEC 102 coverage.

Figure 6:
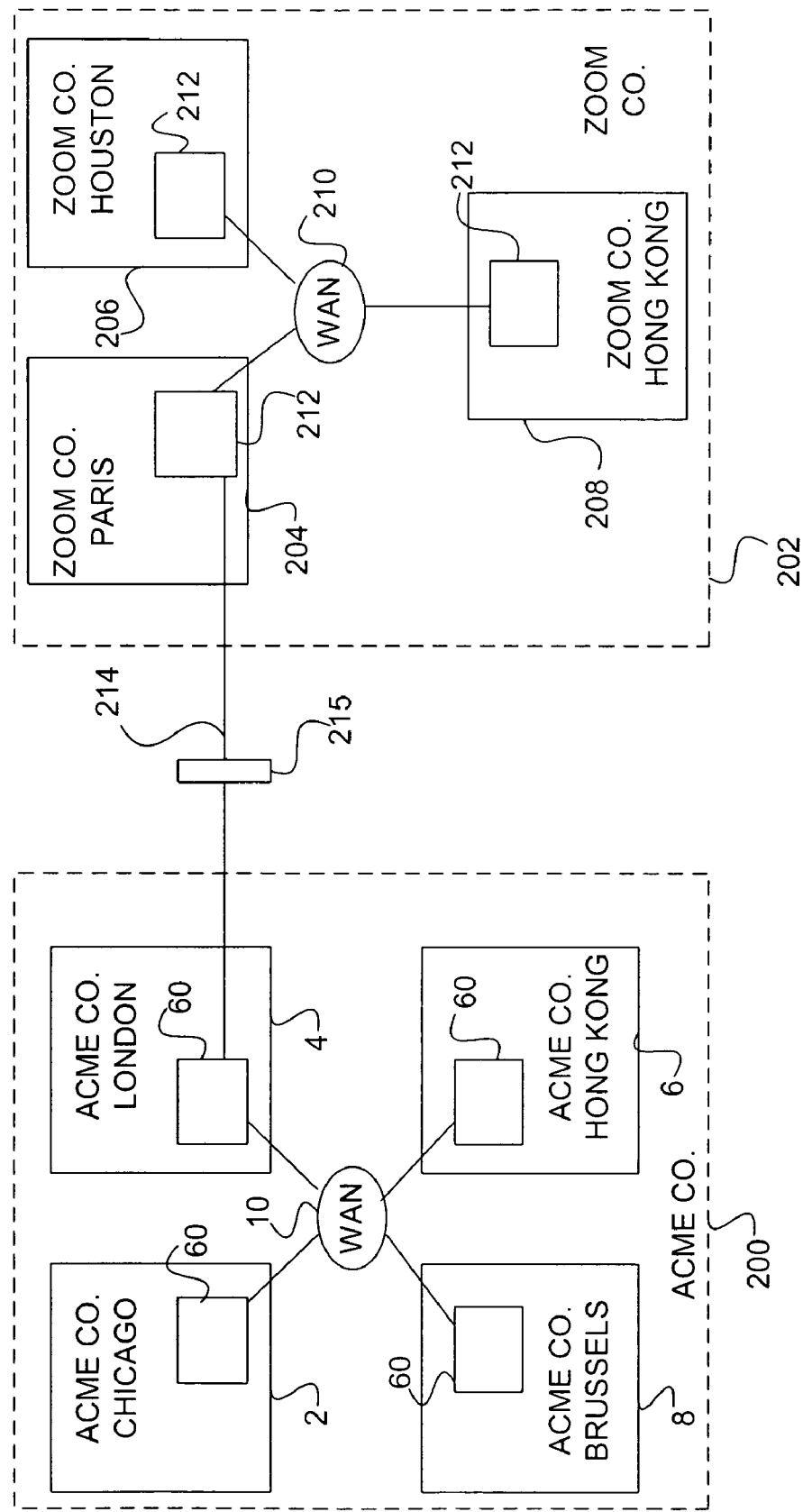
FIG. 6 is a general schematic illustration of the example of two companies having interconnected data networks according to an embodiment of the method of the invention.

In addition, it is to be understood that external phones 112 and 114 are not limited to being within LEC 102 or 104 (respectively) coverage. As a practical matter, savings will result any time the total charges for calling into facility 4 and out of facility 2 are less than would be a direct call using IXC 110. Thus, for example, it may be that external phone 114 of FIG. 6 is located in Milwaukee in a different LEC than LEC 104, but that savings may yet be realized by interconnecting the call between phone 114 in Milwaukee and facility 4 for routing to phone 112 in London as opposed to use of IXC 110.

In addition, the method of the invention is not limited to intra-company networked facilities that are international; significant savings may also of course be realized by practicing the method of the invention for facilities that are separated by any distance that requires services of more than an LEC for phone connection.

In this respect, it is further noted that the term "geographically remote" as used herein is not intended to require any particular amount of distance. It will be seen that the invention as herein described and claimed has value for applications where "geographically remote" may comprise very small distances. As a significant part the economic value of the method of the invention resides in the avoidance or minimization of use of a PSTN, any distance over which a PSTN would be required to carry a phone signal can be thought to be sufficient to meet the definition of "geographically remote" as used herein. Thus, for example, the Acme Co. example illustrated in various Figs. discussed above could comprise a plurality of "geographically remote" facilities that were all located in one city; or for that matter even on a single city block.

Methods for Multiple Company Network:

FIG. 6 illustrates a schematic communications diagram that results from the practice of an additional embodiment of the method of the invention. A first company 200 has a plurality of geographically remote facilities 2, 4, 6, and 8 each with a plurality of phones at each of the facilities (not illustrated), a data network ("WAN") 10 linking the plurality of facilities, and a digital telephony gateway 60 at each of the facilities interfacing the plurality of phones and WAN 10 whereby digital telephony format phone signals may be carried over WAN 10 between facilities 2, 4, 6, and 8. Company 200 as illustrated in FIG. 6 comprises the Acme company described in previous Figs. and above.

A second company 202, by way of example the "Zoom" Co., also has a plurality of geographically remote facilities 204, 206, and 208; a plurality of phones (not illustrated) at each of the locations 204, 206, and 208; a second digital data network 210 linking the facilities; and a digital telephony gateway 212 at each of the facilities 204, 206, and 208 interfacing the data network and the plurality of phones at the respective facility whereby intra-facility phone communications may be achieved over the data network 210.

This embodiment of the method of the invention comprises the step of interconnecting the first data network 10 and the second data network 210, whereby digital telephony format telephone calls may be carried over the interconnected data networks 10 and 210 between any of the Acme Co. facilities 2, 4, 6, or 8, and any of the Zoom Co. facilities 204, 206, and 208. The method of interconnection preferably comprises connecting one of the Acme gateways 60 to one of the Zoom gateways 212 with a digital connection. This is generally illustrated in FIG. 6 as connection 214 between respective gateways at Zoom Co. facility 204 ("Paris") and Acme Co. facility 4 ("London"). As a practical matter, it may be advantageous to interconnect facilities that are geographically close to reduce cost. By way of example, connection 214 may comprise a leased fiber optic cable. Firewall server 215 is also preferably installed on connection 214 to provide security between company 200 and company 202. It is noted that firewall server 215 has been illustrated as a "wall"; as generally discussed herein, however, and as will be appreciated by one skilled in the art, firewall server 215 is preferably a computer programmed to selectively filter network traffic for security purposes. As an example, firewall server 215 may comprises a personal computer programmed to allow only digital telephony traffic to pass between companies, thereby providing a degree of security to each company against unwanted infiltration or use of their respective network.

Figure 7:
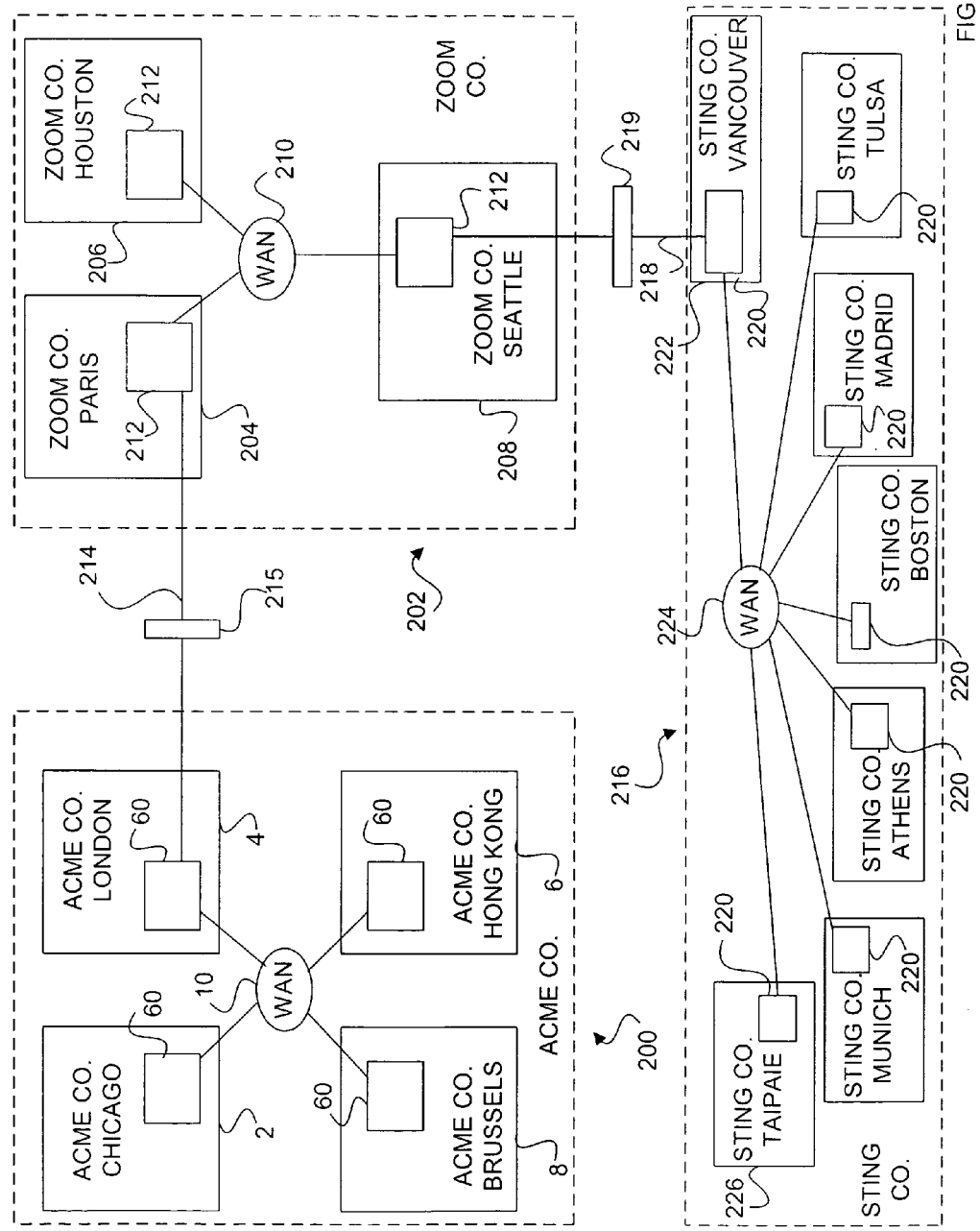
FIG. 7 is an additional general schematic illustration of an example of two companies having interconnected data networks according to an embodiment of the method of the invention.

This embodiment of the method of the invention is not limited to providing two companies for interconnection; a plurality of companies may be interconnected without limitation. Indeed, it will be appreciated that the value of the method of the invention will increase with increasing numbers of additional interconnected companies as a virtual network of larger size is thereby realized. FIG. 7 illustrates a general schematic that results from practice of this embodiment of the method of the invention wherein three companies are provided and interconnected. In addition to the Acme Co. 200 and the Zoom Co. 202 discussed above in reference to FIG. 6, FIG. 7 illustrates the Sting Co. 216 interconnected therewith, with digital connection 218 connecting gateway 220 at Sting Vancouver facility 222 with Zoom Seattle 208 facility's gateway 212. All of the various Sting facilities have been provided with gateways 220 interfacing between intra-facility data network 224 and a plurality of facility phones (not illustrated) for intra-facility digital telephony format phone communication. Firewall server 219 is also preferably installed on connection 214 to provide security between company 216 and companies 200 and 202 as discussed above.

Through practice of this embodiment of the method of the invention, a call may be placed from any of any of the facilities of one company to any of the facilities of a different company over the interconnected data networks without use of any PSTN. Referring to FIG. 7 as an example, an analog phone signal may originate at Sting Co. Taipei's facility 226, be converted to digital telephony format with gateway 220 with an associated unique digital destination address, be routed over Sting WAN 224, connected to Zoom WAN 210 through connection 218, be connected to Acme WAN 10 by connection 214, be converted to standard analog format at gateway 60 in Acme. Co.'s Chicago facility 2, and finally be connected with a phone therein. Thus the call between Taipei and Chicago is made without any PSTN services or charges.

Figure 8:
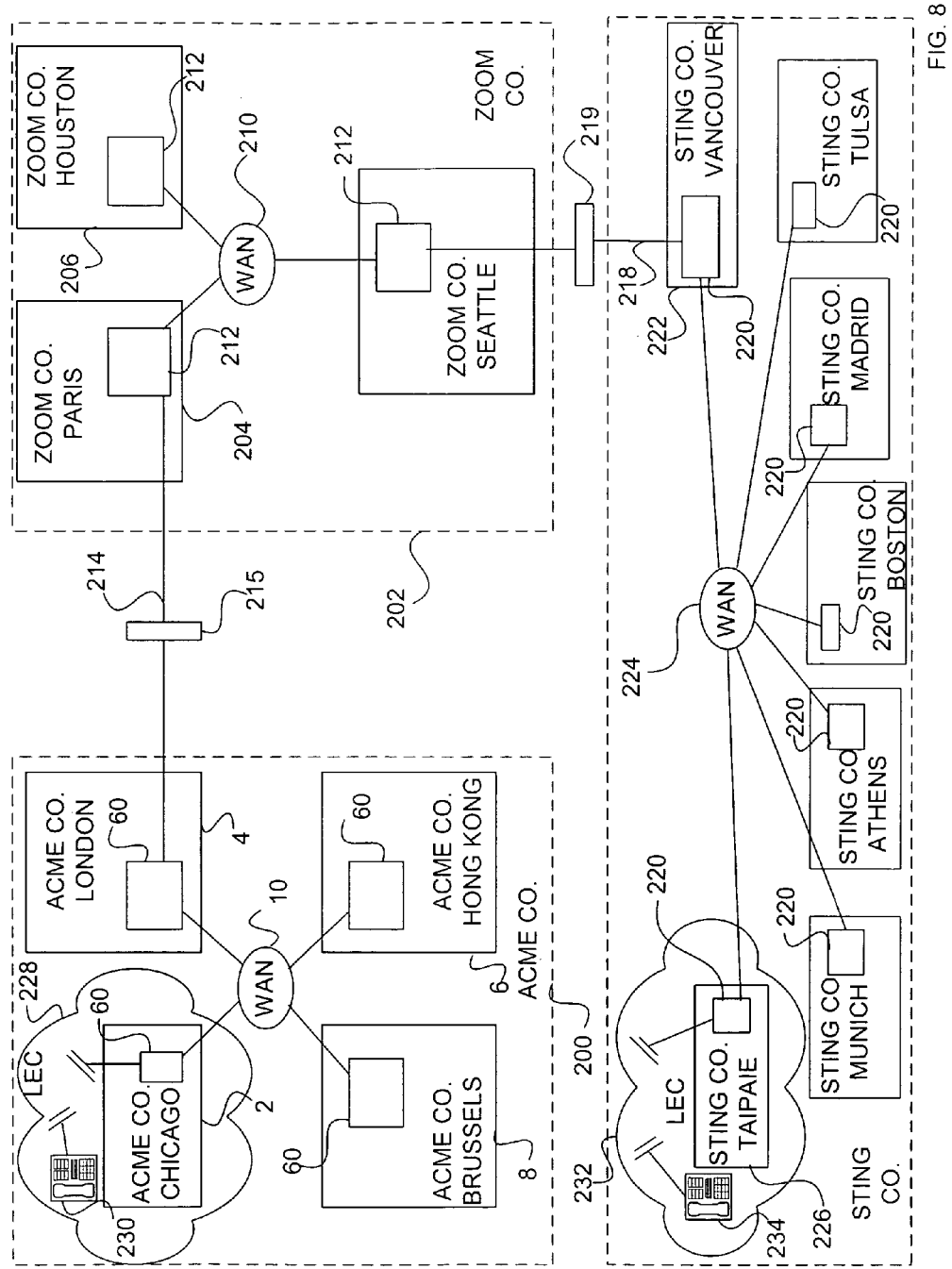
FIG. 8 is a general schematic illustration of an example of three companies having interconnected data networks according to an embodiment of the method of the invention.

In a further extension of this embodiment of the method of the invention, additional method steps comprise providing a PSTN external to at least one of the interconnected facilities, and programming the gateway at at least one of the plurality of facilities of any of the interconnected companies to access an external phone line through a PSTN. Thus the gateway may receive an incoming digital telephony format call over the data network, convert the call to standard analog format, and connect it to a phone external to the facility via a PSTN. Referring to FIG. 8 by way of example, gateway 60 at Acme Co. facility 2 has been programmed to access LEC 228 whereby calls may be delivered to phone 230 external to facility 2. Calls may thereby be sent from any of the plurality of Acme Co. 200, Zoom Co. 202, or Sting Co. 216 facilities over interconnected data networks 10, 210, and 224 in digital telephony format to gateway 60 at facility 2, converted with gateway 60 to standard analog format, and transmitted to external phone 230.

More preferably, additional steps comprise programming a gateway at at least a second of the Acme Co. 200, Zoom Co. 202, or Sting Co. 216 facilities to access a second PSTN external to that facility and assigning a public phone number to the gateway whereby the gateway may be accessed by a phone external to the facility over the PSTN. Referring once again to FIG. 8 as an example, gateway 220 at Zoom Co. facility 226 is programmed to access LEC 232 and assigned a public phone number whereby gateway 220 may receive incoming standard analog phone signals from external phone 234. Additional steps comprise accessing gateway 220 from external phone 234 with a standard analog phone signal over LEC 232, converting the analog signal to digital telephony format with gateway 220, transmitting the digital telephony format signal over interconnected networks 224, 210, and 10 to gateway 60, converting the digital telephony format signal to standard analog format, and transmitting the standard analog signal over LEC 228 to external phone 230.

The practice of this embodiment of the invention thereby enables a call originating at phone 234 external to facility 226 in Taipei to be connected to external phone 230 in Chicago without the services of an IXC. Charges for this call would only total the sum of the Taipei LEC 232 and the Chicago LEC 230, with significant savings thereby realized.

Most preferably all of the gateways at the plurality of the Acme Co. 200, Zoom Co. 202, and Sting Co. 216 are programmed to interface with respective LEC's such that telephone signals may be both received and sent to external phones. It will be appreciated that such widespread extension will create a virtual phone network of greatest value.

Indeed, as companies are added and interconnected to the "virtual" network, the potential destination for calls over the network will of course grow. The value to a potential company of being connected to the network will also grow. Thus the value of the service provided through the method of the invention will be increased. This is a significant business advantage for the method of the invention, as the per customer company revenue can be expected to increase. This per customer increase in revenue is in addition to the "traditional" revenue growth that can be expected as the number of customer companies grows. Thus there is the opportunity for "exponential type" revenue growth when practicing the method of the invention in association with providing a business service.

In addition, it is noted as discussed generally above that the term LEC as used herein is used as a subcategory of a PSTN;

and in that sense the terms are interchangeable. Practice of the method of the invention is not limited to external phones that are within an LEC of a facility. Connection with an LEC by a facility gateway will of course enable that gateway to communicate not only with external phones within an LEC but also with other phones that may be connected thereto through the LEC. Also, although FIG. 8 illustrates connections between gateways and LEC's directly, this is for illustration only. The method of the invention includes providing such connection through switch 22 as is generally illustrated in FIG. 4 and discussed above.

Method for Providing Video Communications:

An additional embodiment of the invention comprises providing video tele-conferencing signals between intra-company facilities. To reduce travel and time expenses, companies often conduct intra-facility one way, two way, or multiple participant video conferences. Typically, signals for such video conferences are carried over in an analog format over a PSTN. More recently, video signals for such conferences have been carried over digital networks that are typically administered and provided by third parties, who are often PSTN carriers.

As an example, if the Acme company of FIG. 1 wished to conduct a video conference between their Chicago facility 2 and their London facility 4, they could contact an LEC such as the Ameritech Co. in Chicago to facilitate the necessary communications. The Ameritech Co. could then provide facility 2 with access to a data network configured to carry the required signal, and would arrange for a similar connection to be made in London for facility 4 by working with an IXC. When the conference was to be conducted, Ameritech would orchestrate the various transmissions and connections that would bring the participants together. Ameritech would then charge Acme on a per minute basis to carry the video conference signal between Chicago and London.

Technology does currently exist to perform low cost two-way video conferencing over the internet or over a data network from desktop personal computers. In particular, products such as NetMeeting available from the Microsoft Corp., Redmond, Wash., are known. These products, however, because of the limited transmission speed available from desktop modems and over networks, tend to deliver limited resolution that results in an image and voice quality that is "jumpy", and substantially lower in quality than those facilitated as generally described above by a PSTN carrier.

Figure 9:
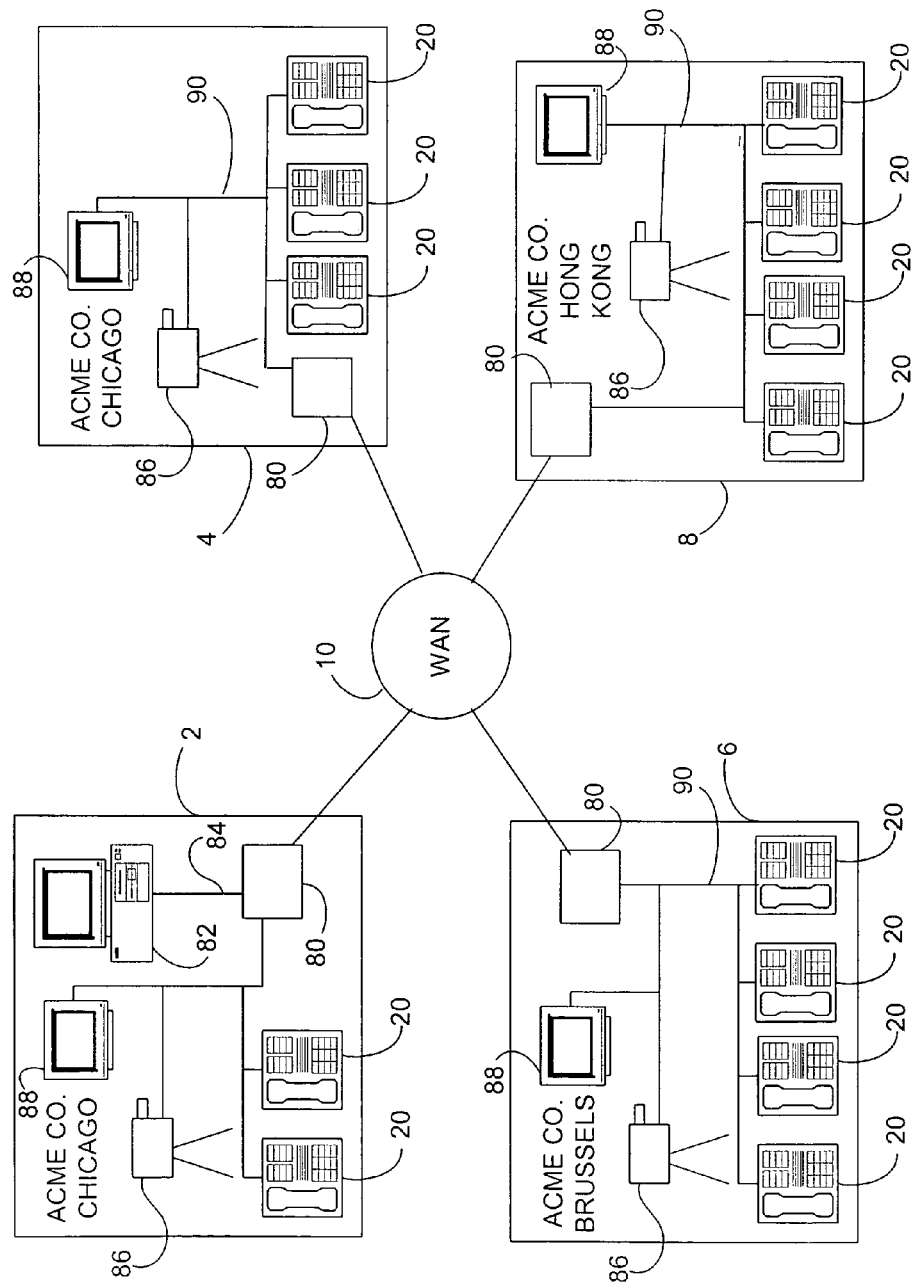
FIG. 9 is a general schematic illustration of the example company of FIG. 1 provided with video communication capabilities through an embodiment of the method of the invention.

This embodiment of the method of the invention addresses these and other currently unresolved problems by comprising steps to provide a company with high speed and high resolution video tele-conferencing capabilities over their own data network, thereby avoiding PSTN or similar costs. FIG. 9 generally illustrates a schematic of the Acme company facilities 2, 4, 6, and 8 of FIG. 1 that result from practice of this embodiment of the method of the invention. A gateway 80 is provided at each of the plurality of facilities that in addition to converting between digital telephony and standard analog telephony as described generally above in reference to gateway 60 of FIG. 4, further has means for converting between standard analog video signals and digital video signals. "Digital video signals" as used herein are intended to refer to packet based digital transmission, and are not limited to any particular format. A preferred example of digital video signals are those as described in International Telecommunication Union's ("ITU") H.323 standards.

Gateway 80 is connected to digital network 10. In addition, a digital controller 82 is provided for controlling digital video traffic over network 10 at at least one of the Acme facilities;

FIG. 9 illustrates controller 82 at facility 2. Preferably, as is illustrated in FIG. 9, controller 82 comprises a desktop computer. As is generally known in the industry, controller 82 may be thought of as a "traffic controller", or a "meeting place" at which vide conferencing participants may virtually "meet up" and connect.

This embodiment of the method of the invention further comprises the steps of providing linkage 84 linking controller 82 to gateway 80, and of providing a video camera 86 and a video monitor 88 at each of the plurality of company facilities 2, 4, 6, and 8. Monitor 88 and camera 86 are linked to gateway 80 by linkage 90. This preferred method of the invention further comprises assigning a unique digital address to each individual of video cameras 86 and monitors 88 that are distributed about the plurality of company facilities 2, 4, 6, and 8; and programming controller 82 to control video conference traffic between the plurality of cameras 86 and monitors 88.

Additional steps comprise converting a standard analog video signal from camera 86 with a first gateway 80 at a first facility to a digital format signal, transmitting the digital signal to a second gateway 80 at a second facility, converting the digital signal to a standard analog video signal with the second gateway 80, and finally transmitting the converted analog signal to a monitor 88 at the second facility. At essentially the same time, video signals may be transmitted in the same manner in the reverse direction from camera 86 from the second facility to monitor 88 in the first facility. In this manner essentially simultaneous two way video conferencing is achieved through the preferred method of the invention by a company without encountering any PSTN carrier charges.

It is further noted that gateway 80 preferably performs the same voice signal conversion functions as gateway 60 described above in reference to FIG. 4. Thus gateway 80 is illustrated in FIG. 9 as interfacing with a plurality of phones 20 at each respective facility 2, 4, 6, and 8.

It is likewise further noted that the video capability of this embodiment of the invention may likewise be combined with the various telephony embodiments of the invention to provide video conferencing between facilities of a first company and facilities of a second company over interfaced first and second company data networks. Likewise, gateway 80 may interface with a PSTN to carry video teleconferencing signals to a location external to any of facilities 2, 4, 6, and 8.

The advantages of the disclosed invention are thus attained in an economical, practical, and facile manner. While preferred embodiments and example configurations have been shown and described, it is to be understood that various further modifications and additional configurations will be apparent to those skilled in the art. It is intended that the specific embodiments and configurations herein disclosed are illustrative of the preferred and best modes for practicing the invention, and should not be interpreted as limitations on the scope of the invention as defined by the appended claims.

What is claimed is:

1. A method, comprising:
   a first telecommunication system at a first facility communicating, via digital telephony, over a data network with a second telecommunication system at a second facility, wherein the first and second telecommunication systems include first and second pluralities of interconnected telephones, respectively; and
   wherein, prior to the communicating, the first telecommunication system has been configured for communication with the second telecommunication system according to a digital telephony solution, wherein the digital telephony solution is based, at least in part, on a determination of call traffic patterns between the first and second facilities and a determination of performance characteristics of the data network, wherein the digital telephony solution specifies an amount of bandwidth needed for communicating between the first and second telecommunication systems, and wherein configuring the first telecommunication system includes programming a first gateway within the first telecommunication system to transmit digital telephony signals to the second telecommunication system using a dedicated portion of bandwidth of the data network, wherein the dedicated portion supplies the amount of bandwidth specified by the digital telephony solution.

2. The method of claim 1, wherein the digital telephony solution is based, at least in part, on determinations of durations of phone calls made between the first and second facilities for a selected time period.

3. The method of claim 1, wherein the digital telephony solution is based, at least in part, on a determination of costs of phone calls made between the first and second facilities during a selected time period.

4. The method of claim 1, wherein the digital telephony solution is based, at least in part, on a determination of the peak number of phone calls made between the first and second facilities during a selected time period.

5. The method of claim 1, wherein the digital telephony solution is based, at least in part, on two or more of the following: determinations of durations of phone calls made between the first and second facilities during a selected time period, a determination of costs of phone calls made between the first and second facilities during a selected time period, a determination of the peak number of phone calls made between the first and second facilities during a selected time period.

6. The method of claim 1, wherein the digital telephony solution is based, at least in part, on an analysis of a call detail record for calls between the first and second facilities.

7. The method of claim 1, wherein the performance characteristics include average available bandwidth of the data network.

8. The method of claim 1, wherein the performance characteristics include one or more of the following: average bandwidth utilization, average packet loss over the data network.

9. The method of claim 5, wherein the performance characteristics include one or more of the following: average bandwidth utilization, average packet loss over the data network.

10. The method of claim 5, wherein the digital telephony solution is based, at least in part, on a specified average packet loss.

11. A system, comprising:
a first telecommunication system at a first facility configured to communicate, via digital telephony, over a wide-area data network to a second telecommunication system at a second facility, wherein the first and second telecommunication systems include first and second pluralities of telephones, respectively, and wherein the first telecommunication system includes a gateway to the wide-area data network;
wherein the first telecommunication system has been configured for communication with the second telecommunication system according to a digital telephony solution, wherein the digital telephony solution is based, at least in part, on a determination of call traffic patterns between the first and second facilities and a determination of performance characteristics of the data network, and wherein the digital telephony solution specifies an amount of bandwidth needed for communicating between the first and second telecommunication systems, and wherein the first telecommunication system has been configured by programming the gateway to transmit digital telephony signals to the second telecommunication system using a dedicated portion of bandwidth of the data network, wherein the dedicated portion supplies the amount of bandwidth specified by the digital telephony solution.

12. The system of claim 11, wherein the digital telephony solution is based, at least in part, on determinations of durations of phone calls made between the first and second facilities during a selected time period.

13. The system of claim 11, wherein the digital telephony solution is based, at least in part, on a determination of costs of phone calls made between the first and second facilities during a selected time period.

14. The system of claim 11, wherein the digital telephony solution is based, at least in part, on a determination of the peak number of phone calls made between the first and second facilities during a selected time period.

15. The system of claim 11, wherein the digital telephony solution is based, at least in part, on two or more of the following determinations: a determination of durations of phone calls made between the first and second facilities during a selected time period, a determination of costs of phone calls made between the first and second facilities during a selected time period, and a determination of the peak number of phone calls made between the first and second facilities during a selected time period.

16. The system of claim 15, wherein the performance characteristics include one or more of the following: average bandwidth utilization, average packet loss over the data network.

17. The system of claim 15, the digital telephony solution is based, at least in part, on a specified packet loss and a specified data transmission delay.

18. The system of claim 11, wherein the digital telephony solution is based, at least in part, on an analysis of a call detail record for calls between the first and second facilities.

19. The system of claim 11, wherein the performance characteristics include available bandwidth of the data network.

20. The system of claim 11, wherein the performance characteristics include one or more of the following: average bandwidth utilization, average packet loss over the data network.

21. A method, comprising:
determining a digital telephony solution for first and second facilities connected via a wide-area data network, wherein the digital telephony solution is based, at least in part, on a determination of call traffic patterns between the first and second facilities and on a determination of performance characteristics of the data network, wherein the digital telephony solution specifies an amount of bandwidth for communicating between a first telecommunication system at the first facility and a second telecommunication system at the second facility, wherein the first and second telecommunication systems include first and second pluralities of telephones, respectively; and
after determining the digital telephony solution, configuring the first telecommunication system according to the digital telephony solution to make subsequent telephone calls over the data network to the second telecommunication system;

wherein the configuring includes programming a first gateway within the first telecommunication system to transmit digital telephony signals to the second telecommunication system using a dedicated portion of bandwidth of the data network, wherein the dedicated portion supplies the amount of bandwidth specified by the digital telephony solution.

22. The method of claim 21, wherein the determination of digital telephony call traffic patterns includes determinations of durations of phone calls made between the first and second facilities during a selected time period.

23. The method of claim 21, wherein the determination of digital telephony call traffic patterns includes a determination of costs of phone calls made between the first and second facilities during a selected time period.

24. The method of claim 21, wherein the determination of digital telephony call traffic patterns includes a determination of the peak number of phone calls made between the first and second facilities during a selected time period.

25. The method of claim 21, wherein the determination of digital telephony call traffic patterns includes two or more of the following: determinations of durations of phone calls made between the first and second facilities during a selected time period, a determination of costs of phone calls made between the first and second facilities during a selected time period, a determination of the peak number of phone calls made between the first and second facilities during a selected time period.

26. The method of claim 25, wherein the digital telephony solution is based, at least in part, on a specified packet loss and a specified data transmission delay.

27. The method of claim 21, wherein the determination of digital telephony call traffic patterns includes an analysis of a call detail record for calls between the first and second facilities.

28. The method of claim 21, wherein the performance characteristics include average available bandwidth of the data network.

29. The method of claim 21, wherein the performance characteristics include one or more of the following: average bandwidth utilization, average packet loss over the data network.

* * * * *